United States Patent [19]

Model et al.

[11] 3,904,696

[45] *Sept. 9, 1975

[54] HALOGENATED HYDROXY-DIPHENYL ETHERS

[75] Inventors: Ernst Model, Basel; Jakob Bindler, Riehen, both of Switzerland

[73] Assignee: Ciba-Geigy Corporation, Ardsley, N.Y.

[*] Notice: The portion of the term of this patent subsequent to Apr. 13, 1987, has been disclaimed.

[22] Filed: Dec. 29, 1972

[21] Appl. No.: 319,267

Related U.S. Application Data

[63] Continuation of Ser. No. 11,894, Feb. 16, 1970, which is a continuation-in-part of Ser. No. 570,742, Aug. 8, 1966, which is a continuation-in-part of Ser. No. 345,080, Feb. 17, 1964, abandoned.

[52] U.S. Cl. ......... 260/613 R; 260/571; 260/465 F; 260/465 G; 424/341; 424/330; 424/304
[51] Int. Cl.² .......................................... C07C 43/22
[58] Field of Search ................................ 260/613 R

[56] References Cited
UNITED STATES PATENTS
3,506,720  4/1970  Model et al. ..................... 260/613 R FOREIGN PATENTS OR APPLICATIONS
6,401,526  8/1964  Netherlands .................... 260/613 R OTHER PUBLICATIONS
Geigy, Chem. Abs., Vol. 63, (1965), 11431.

*Primary Examiner*—Bernard Helfin

[57] ABSTRACT

Halogen-2-hydroxy-diphenyl ethers are useful in bactericidal compositions and method in the protection of organic materials. Illustrative compounds are 2',4,4',5-tetrachloro-2-hydroxydiphenyl ether, 4,4',5-trichloro-2-hydroxydiphenyl ether, 2',4,4'-trichloro-5-bromo-2-hydroxydiphenyl ether and 4,4'-dichloro-5-bromo-2-hydroxyphenyl ether.

7 Claims, No Drawings

HALOGENATED HYDROXY-DIPHENYL ETHERS

This is a continuation of application Ser. No. 11,894, filed on Feb. 16, 1970, which is a continuation-in-part of our co-pending application Ser. No. 570,742, filed Aug. 8, 1966, which is a continuation-in-part of our co-pending application, Ser. No. 345,080, filed Feb. 17, 1964, now abandoned.

DESCRIPTION OF THE INVENTION

The present invention relates to novel halogenated hydroxy-diphenyl ethers which are useful in the control of microorganisms, and for the protection of organic materials and articles from microorganisms, particularly from bacteria and especially from infestation with bacteria and growth of bacteria thereon, more especially, in a first aspect, for the disinfection of personal and household linen, and for the protection of such materials from growth of microorganisms thereon, and as bacteriostatic agents in bactericidal compositions, for instance, washing agents and liquors.

Such control of microorganisms and, particularly, bacteria, and more especially disinfection of a substrate normally permitting undesirable growth of bacteria thereon and/or protection of said substrate against such growth, consists essentially of applying to said substrate a disinfecting and bacterial growth-inhibiting amount of a compound of the formula I:

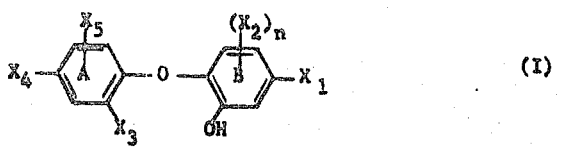
(I)

wherein
$X_1$ is chlorine, bromine or hydrogen
$X_2$ is chlorine or bromine
$X_3$ is hydrogen, chlorine or bromine
$X_4$ is chlorine, bromine, alkyl having 1 to 3 carbon atoms, $CH_3O-$, $-CN$ or $-NH_2$,
$X_5$ is hydrogen, chlorine, bromine, methyl, trifluoromethyl, $CH_3O-$, $-CN$ or $-NH_2$, and
$n$ is 1 or 2.

Among these compounds of the formula I are two groups. The first of these groups has the formula I with the definition for $X_1$ as chlorine or/and bromine, $X_2$ as chlorine or bromine, $X_3$ as hydrogen, chlorine or bromine, methyl and trifluoromethyl and $n$ as 1.

The preferred compounds of this group are those wherein $X_2$ is in the position 5 of the nucleus B. In the most preferred compounds are $X_4$ chlorine or bromine and $X_5$ hydrogen, chlorine or bromine. The second of these groups has the formula I with the definition of $X_1$ as hydrogen, $X_2$ chlorine or bromine, $X_3$ hydrogen, chlorine or bromine, $X_4$ as chlorine, bromine, methyl or $NH_2$ and $X_5$ as hydrogen, chlorine, bromine, methyl, trifluoromethyl or $NH_2$ and $n$ as 1 or 2. Among the second group are two sub-groups. In the first of these sub-groups $n$ is defined as 1 and $X_2$ is fixed to position 5 of the nucleus B. In the most preferred compounds of the first sub-group is $X_4$ chlorine and bromine and $X_5$ is hydrogen, chlorine and bromine. In the second of the mentioned sub-groups $n$ is defined as 2, whereby those compounds are preferred having $X_2$ fixed to the positions 3 and 5 of the nucleus B. Most preferred are in this sub-group the compounds with $X_4$ as chlorine and bromine and $X_5$ as hydrogen, chlorine and bromine.

Preferred compounds of the present invention are 2-',4,4',5-tetrachloro-2-hydroxydiphenylether, 4,4',5-trichloro-2-hydroxydiphenylether, 2',4,4'-trichloro-5-bromo-2-hydroxydiphenylether and 4,4'-dichloro-5-bromo-2-hydroxydiphenylether.

Compositions according to the invention which contain a compound falling under Formulas I as active ingredient, in a bacteria growth-inhibiting amount, are distinguished by slight toxicity for warm blooded animals and, in conventionally used concentrations, do not irritate the skin. They are bactericidally effective both against gram positive as well as gram negative bacteria, for example, against *Bacillus mesientericus*, Sarcina spec. and particularly against forms of Coli such as against *Escherichia coli* 96 and other gram negative organisms. A further advantage of the halogen-o-oxydiphenyl ethers used according to the invention is their colorlessness or slight inherent color. This property enables them to be used for many purposes for which it is not possible to use strongly solored known bactericidal compounds.

The above described compounds are not soluble in water but they are soluble in dilute sodium and potassium hydroxide solutions and/or in all practical organic solvents. Because of this solubility, they can be used under a first aspect according to the invention in very many ways for the combatting of microorganisms, particularly of bacteria, and for the protection of organic materials and objects from attack by microorganisms.

They can thus be incorporated directly into the material to be protected, for example in material having a synthetic resin basis, as polyamides and polyvinylchloride in paper treatment liquors, in printing thickeners made from starch or cellulose derivatives, in lacquers and paints which contain, e.g. casein, in cellulose, in viscose spinning mass, in paper, in animal mucilages or oils, in permanent dressings having a basis of polyvinyl alcohols, in cosmetic articles such as in soaps, e.g. in hand or toilet soap, in ointments or powders. They can also be added to preparations of inorganic or organic pigments for the painting industry, plasticizers, etc.

Moreover, the above-described compounds of Formulas I can be used in the form of their organic solutions, e.g. as so-called spray or as dry cleaners. As organic solvents, preferably those not miscible with water are used, in particular, petroleum fractions, but also water miscible solvents can be used such as low alcohols, e.g. methanol or ethanol or ethylene glycol monomethyl or monoethyl ether.

In addition, they can be used with wetting or dispersing agents in the form of their aqueous dispersions, e.g. for the protection of substances which tend to rot, such as for the protection of leather, paper etc.

Solutions or dispersions of active ingredient which can be used for the protection of these materials advantageously have a content of active ingredient of at least 0.001 g/liter.

A preferred use for the diphenyl ether derivatives consists in disinfecting goods which are washed, and protecting such goods from attack by microorganisms. For this purpose, either washing or rinsing liquors are used which contain the diphenyl ethers advantageously in concentrations of about 1 to 200 parts per million calculated on the liquor.

As wash-active substances, the washing liquors contain, for example, anion active compounds such as aromatic sulfonic acids substituted by lipophilic groups or their water soluble salts such as the sodium salt of dodecyl benzene sulfonic acid, of water soluble salts of sulfuric acid monoesters of higher molecular alcohols or their polyglycol ethers, e.g. soluble salts of dodecyl alcohol sulfate, or of dodecyl alcohol polyglycol ether sulfate, or alkali metal salts of higher fatty acids (soaps), also non-ionogenic wash-active substances such as polyglycol ethers of higher fatty alcohols, polyglycol ethers of higher molecular alkylated phenols as well as so-called "amphoteric" wash-active substances such as reaction products of the alkali metal salts of low halogen fatty acids and polyalkylene polyamines containing lipohilic radicals, e.g. lauryl diethylenetriamine. In addition the liquor can also contain the usual auxiliaries such as water soluble perborates, polyphosphates, carbonates, silicates, optical brightening agents, plasticisers, salts having an acid reaction such as ammonium or zinc silicofluoride or certain organic acids such as oxalic acid, also dressings such as, e.g. those having a basis of synthetic resin or starch.

Chiefly, organic fibers are meant by goods which can be disinfected with the washing or rinsing liquors according to the invention, containing the above-described active compounds, namely those of natural origin such as cellulosic fibers, e.g. cotton, or polypeptide fibers, e.g. wool or silk, as well as fibers of synthetic origin such as polyamide, polyacrylonitrile or polyester fibers or mixtures of the aforesaid fibers.

In the concentrations mentioned above, the diphenyl ether derivatives usable according to the invention disinfect the wash liquor as well as the goods to be washed therein substantially free from *Staphilococcus aureus* or Coli and other bacteria, and these substrates remain free from these bacteria for a long time even after exposure to light of the active ingredient or of the goods treated therewith. They differ from other bactericidally active compounds particularly in their stability to light on the goods treated therewith.

In a second aspect the invention concerns the protection of cellulosic materials such as wood and plants from the attack of microorganisms, among them rot-causing fungi, phytopathogenic fungi and bacteria.

Such protection comprises the application to the surface of such materials, or incorporation thereinto, of a compound of the formula I in an amount sufficient to inhibit the growth of such microorganisms as rot-causing and phytopathogenic fungi and bacteria.

According to a third aspect, this invention concerns more particularly a process for combatting pathogenic bacteria in the intestinal system and the urinal tract of warm-blooded animals, and generally, in all mammalia, consisting essentially of administering to a warm-blooded animal suffering from an attack of pathogenic bacteria in one of the said organs a bacteria growth-inhibiting amount of a compound falling under formula I preferably in combination with an inert carrier therefor of the type described in detail further below.

The compounds of formula I have an excellent growth-inhibiting action, for example, on the following gram positive and gram negative bacteria: *Staphylococcus aureus Smith, Staphylocuccus lactis, Escherichia coli, Bacillus pumilus, Bacillus subtilis, Corynebacterium diphtheriae, Clostridium botulinum, Clostridium butyricum, Clostridum welchii, Clostridium tetani, Klebsiella pneumoniae, Alcaligenes faecalis, Salmonella pullorum, Salmonella typhi, Salmonella paratyphi* A and B, *Salmonelly typhi murium, Salmonella enteritidis, Shigella dysentariae, Shigella flexneri, Brucella abortus, Proteus mirabilis, Achromobacter* spec., *Serratia marcescens, Pasteurella pseudotuberculosis*.

They also inhibit the growth of the following pathogenic fungi:

*Trichophyton mentagrophytes, Trichophyton rubrum, Trichophyton tonsurans* var. *sabourandi, Trichophyton schonleini, Trichophyton quickeanum, Microsporon canis, Microsporon gypseum, Blastomyced dermatidis, Sporotrichum schenkii, Epidermophyton floccosum, Alternaria tenuis, Botrytis cenerea*.

The use of compounds of formula I as active ingredients, is particularly valuable for the healing of diseased conditions of the intestinal system and urinal tract of warm blooded animals particularly in combatting pathogenic fungi and bacteria, since they are eliminated from the body in substantially unchanged, active form and they possess a low toxicity.

Suitable for the latter type of use are tablets for the disinfection of the mouth and throat as well as tablets and sugar coated tablets (dragees) for the disinfection of the intestinal system and urinal tract.

Moreover, compounds of formula I are also useful as active ingredients for disinfectants for the hands, for example in soaps, cosmetics, ointments for wounds, eye ointments, ointments for skin and other agents for external use.

The diphenyl ethers usable according to the invention are also very active against the bacterial flora causing perspiration odours and, therefore, because of their low toxicity, are suitable as deodorants for linen and for incorporation into cleansing agents such as soaps or shampoos or as additives for cosmetics such as ointments or creams.

The diphenyl ethers usable according to the invention can also be used in combination with other antimicrobially active substances, for example they can be used with halogenated salicylic acid alkyl amides and anilides, with halogenated diphenyl ureas, with halogenated benzoxazoles or benzoxazolones, with polychlorohydroxydiphenyl methanes, with halogen-dihydroxydiphenyl sulphides, with bactericidal 2-imino-imidazolidines or -tetrahydropyrimidines or with biocidal quaternary compounds or with certain dithiocarbamic acid derivatives such as tetramethyl thiuram disulphide.

In addition, with some of the combinations mentioned of diphenyl ethers used according to the invention and other antimicrobial substances, there is a broadening of the range of action and/or a synergistic effect.

The compounds of the present invention can be produced by halogenation of the corresponding halogenated and/or otherwise substituted 2-hydroxydiphenylether containing in the 5-position a hydrogen which can be prepared according to the copending application, Ser. No. 570,742, filed Aug. 8, 1966, by known processes, e.g. with elementary chlorine or bromine or with halogenating agents like sulfuryl chloride, in order to receive the desired 5-halogenated 2-hydroxy-diphenylethers of formula I. Suitable 2-hydroxydiphenylethers which can be halogenated in 5-position from the copending application mentioned above are, for example:

2′,4,4′-trichloro-2-hydroxydiphenylether,
4,4′-dichloro-2-hydroxydiphenylether,
4,4′-dibromo-2-hydroxydiphenylether,
4′-methyl-4-chloro-2-hydroxydiphenylether,
2′,4,4′,5′-tetrachloro-2-hydroxydiphenylether,
4,4′-dichloro-3′-trifluoromethyl-2-hydroxydiphenylether,
4,4′-dichloro-3′-methyl-2-hydroxydiphenylether,
4′-methoxy-4-chloro-2-hydroxydiphenylether,
4,4′-dichloro-2′-cyano-2-hydroxydiphenylether.

In case of 2-hydroxydiphenylethers containing an amino group, the amino group is acetylated before the halogenation takes place and afterwards hydrolized to the corresponding halogenated amino-2-hydroxydiphenylether. A suitable amino-2-hydroxydiphenylether according to the copending application, Ser. No. 570,742, filed Aug. 18, 1966, is for example:
4,4′-dichloro-2′-amino-2-hydroxydiphenylether.

A second process for the preparation of the compounds of formula II consists of reacting halogenated 1-hydroxy-2-alkoxybenzenes with 1-nitro-2-halogenobenzenes or with 1-nitro-4-halogenobenzenes respectively, reducing the resulting halogenated 2-methoxy-4′-nitro-diphenylether or the 2-methoxy-2′-nitro-diphenylether respectively, to the corresponding amino-diphenylethers, hydrolysation of the methoxy group to the free hydroxy-diphenylethers and finally splitting off the amine group by diazotation to receive the desired halogenated 2-hydroxy-diphenylethers.

1-Hydroxy-2-alkoxybenzenes suitable for the condensation with 1-nitro-2-halogeno-benzenes are for example: 1-hydroxy-2-methoxy-4,5-dichlorobenzene, or 1-hydroxy-2-methoxy-4,5-dibromobenzene. Examples of 1-nitro-2-halogenobenzenes are 1-nitro-2,5-dichlorobenzene, 1-nitro-2,3,5-trichlorobenzene, or 1-nitro-2,5-dibromobenzene.

A third method according to the copending application mentioned before consists in the condensation of 1-alkoxy-2-chlorobenzene or 1-alkoxy-2-bromobenzene with an alcali-metal-salt of a hydroxybenzene which may be substituted by halogen, alkyl, or a trifluoromethyl group; the condensation being performed in the presence of copper (I) salts of copper powder to form the corresponding o-alkoxydiphenylether and finally the alkoxy group converted into the hydroxyl group. Halogenation with chlorine, bromine or SO$_2$Cl$_2$ of the 2-hydroxydiphenylethers prepared in this process leads to the compounds of formula III.

The preparation of 2-hydroxy-diphenylethers of Formula III containing an amino group according to the third method is modified in so far that the intermediate amino-2-alkoxy-diphenylether is acetylated and afterwards halogenated and hydrolysed to the corresponding amino-2-alkoxy-3,5-dihalogenated hydroxy-diphenylether or the amino-2-alkoxy-5-halogenated hydroxy-diphenylether, respectively, which finally, by opening of the methoxyether leads to the amino-2-hydroxy-diphenylether of Formula III. An example is:
4′,3,5-trichloro-2′-amino-2-hydroxydiphenylether.
An other modification consists in the acetylation of an amino-2-hydroxy-diphenylether not yet halogenated in ring B. The halogenation leads to the acetylamino-3,5-dihalogeno-2-hydroxydiphenylether or the acetylamino-5-halogeno-2-hydroxy-diphenylether, respectively, which then is hydrolised to the products of Formula III.

The following non-limitative examples further illustrate the invention.

EXAMPLE 1

In a three necked flash equipped with a stirrer, thermometer and a dropping funnel 25,5 g of 4,4′-dichloro-2-hydroxy-diphenylether are dissolved in 35 ml of glacial acetic acid. In the dropping funnel 15,98 g of elementary bromine are dissolved in 20 ml of glacial acetic acid and added dropwise over one hour at 8° – 10°C to the solution of 4,4′-dichloro-2-hydroxy-diphenylether.

The reaction product was stirred for three hours at room temperature and then added to 1,5 liter of ice-water. The oily product which separates is stirred in the ice-water for 2 hours and solidifies slowly. Filtration and drying in vacuum yields 32 g of a product melting at 80° – 90°C. After recrystallisation the 4,4′-dichloro-5-bromo-2-hydroxy-diphenylether melts at 98° – 100°C in a yield of 61.7 %.

EXAMPLE 2

In analogy to Example 1 4,4′-dichloro-2-hydroxy is replaced by 2′,4,4′-trichloro-2-hydroxy-diphenylether and brominated to 2′,4,4′-trichloro-5-bromo-2-hydroxy-diphenylether with the m.p. of 91° – 93°C.

With the same procedure as described in Example 1 the following further 5-bromo-2-hydroxy-diphenylethers can be prepared:
4,4′,5-tribromo-2-hydroxy-diphenylether,
4′-methyl-4-chloro-5-bromo-2-hydroxy-diphenylether,
4,4′-dichloro-3′-trifluoromethyl-5-bromo-2-hydroxydiphenylether,
4′-methoxy-4-chloro-5-bromo-2-hydroxy-diphenylether,
2′-amino-4,4′-dichloro-5-bromo-2-hydroxy-diphenylether.

EXAMPLE 3

In a three necked flask equipped with stirrer, thermometer and dropping funnel 28,9 g of 2′,4,4′-trichloro-2-hydroxy-diphenylether are dissolved in 100 ml of chlorobenzene. At a temperature of 25°C 13,9 g of sulfuryl chloride are added dropwise. Over night the temperature is kept at 90° – 100°C and finally for three hours at reflux temperature. The reaction mixture is cooled down to 60°C and the solvent distilled off in vacuum. The residue is then recrystallized three times in petroleum ether yielding the desired 2′,4,4′,5-tetrachloro-2-hydroxy-diphenylether with the m.p. of 85° – 87°C.

EXAMPLE 4

By substituting 2′,4,4′-trichloro-2-hydroxy-diphenylether with 4,4′-dichloro-2-hydroxy-diphenylether as described in Example 3 and chlorination, the new 4,4′,5-trichloro-2-hydroxy-diphenylether with the m.p. of 85° – 87°C was prepared.

Further 5-chloro-2-hydroxy-diphenylethers which can be prepared in analogy to Example 3 are:
4,4′-dibromo-5-chloro-2-hydroxy-diphenylether,
4,5-dichloro-4′-methyl-2-hjydroxydiphenylether,
2′,4,4′,5,5′-penta-chloro-diphenylether,
2′-amino-4,4′,5-trichloro-2-hydroxy-diphenylether.

EXAMPLE 5 a. 25 g of 4-chlorophenol are dissolved in 150 ml of dimethylformamid. To this solution 13,2 g of powdered potassium-hydroxyd and 0,2 of copper powder are added. The reaction mixture is heated to 90°C and at this temperature 37,4 g of 1-methoxy-2-bromobenzene are added dropwise within 10 minutes. Heating is continued for 15 hours at reflux temperature. After cooling down to room temperature the reaction mixture is poured in 2 liter of water containing 50 ml of 30% sodium-hydroxyd solution. The oily product is extracted with ether; the ether phase washed neutral with water and the ether evaporated. The crude oil is distilled and the fraction with the b.p. of 107° – 110°C at 0,02 mm collected. Recrystallisation from petroleum ether yields 4'-chloro-2-methoxy-diphenylether with a m.p. of 50° – 52°C.

b. 9,36 g of 4'-chloro-2-methoxy-diphenylether are dissolved in 40 ml of glacial acetic acid. Then 25 ml of hydrobromic acid are added. The resulting turbid reaction mixture is heated over night whereby a clear solution is formed. After cooling down to room temperature the product of 4'-chloro-2-hydroxy-diphenylether is precipitated with water, filtered off, dried and recristallized in petroleum ether to yield 6 g (68 %) of pure 4'-chloro-2-hydroxy-diphenylether with the m.p. of 82° – 84°C.

c. 8,8 g of 4'-chloro-2-hydroxy-diphenylether are dissolved in 70 ml of glacial acetic acid. At a temperature of 20°C 6,2 g of chlorine are bubbled into the reaction mixture within about 90 minutes. This reaction is slightly exotherm. After stirring at room temperature over night the reaction product is poured into 400 ml of ice water. The crude product is extracted with benzene, washed neutral with water, the benzene phase dried over sodium sulfate, the benzene distilled off under reduced pressure and the yield of 12 g recrystallized in petroleum ether to receive pure 3,4',5-trichloro-2-hydroxy-diphenylether with the m.p. of 79° – 81°C.

Chlorination with only one equivalent of chlorine furnishes the 4',5-dichloro-2-hydroxy-diphenylether.

With this same procedure the following compounds can be prepared:
4'-methyl-3,5-dichloro-2-hydroxy-diphenylether,
4'-chloro-3'-trifluoromethyl-3,5-dichloro-2-hydroxy-diphenylether,
3',4',3,5-tetrachloro-2-hydroxy-diphenylether.

Bromination according to Example 1 leads to the corresponding brominated products:
4'-chloro-3,5-dibromo-2-hydroxy-diphenylether, (m.p. 96°–98°C)
4'-methyl-3,5-dibromo-2-hydroxy-diphenylether,
4'-chloro-3'-trifluoromethyl-3,5-dibromo-2-hydroxy-diphenylether,
4'-chloro-5-bromo-2-hydroxy-diphenylether.

EXAMPLE 6

Agar Incorporation Test

For each test the active substance to be tested was added in graduated concentrations to nutrient agar (Difco) The test substance was first dissolved in Methyl Cellosolve\*, and the following concentrations of each of the test substances, calculated on the weight of the nutrient agar, prepared:

0.1, 0.3, 1, 3, 10, 30, 100 and 300 parts per million (p.p.m.).

\*Methyl Cellosolve is a tradename of Union Carbide Corp.

The resulting mixtures were then poured directly into sterile 100 mm Petri dishes in amounts of about 20 ml per dish. After inoculation with the bacteria the agar plates were incubated for 48 hours at 37°C. The lowest concentration of the different test substances incorporated in the nutrient agar which inhibited all growth of the bacteria was then tabulated.

The following strains of bacteria were tested:
Staphylococcus aureus (Staph.aureus)
Escherichia coli (E.coli)
Streptococcus faecalis
Brevibacterium ammoniagenes
Sarcina ureae
Proteus vulgaris
Bacillus subtilis
Salmonella pullorum The results are compiled in the table below giving the minimal inhibitory concentration of test substances in the nutrient agar expressed in p.p.m., and compound A is 4,4',5-trichloro-2-hydroxy-diphenylether, compound B is 4,4'-dichloro-5-bromo-2-hydroxy-diphenylether, compound C is 2',4,4',5-tetrachloro-2-hydroxy-diphenylether, and compound D is 2',4,4'-trichloro-5-bromo-2-hydroxy-diphenylether.

| Bacteria | minimum inhibition concentration in p.p.m. | | | |
|---|---|---|---|---|
| Staph.aureus | 3 | 3 | 1 | 3 |
| E.coli | 3 | 3 | 3 | 3 |
| Streptococcus faecalis | 3 | 3 | 3 | 3 |
| Brevibact.ammoniagenes | 3 | 3 | 3 | 1 |
| Sarcina ureae | 3 | 10 | 3 | 3 |
| Proteus vulgaris | 3 | 10 | 3 | 3 |
| Bacillus subtilis | 3 | 3 | 3 | 10 |
| Salmonella pullorum | 3 | 10 | 3 | 3 |
| Compound | A | B | C | D |

EXAMPLE 7

Laundry Test - Wash Bath Disinfection

This test shows the disinfectant effect of the test substances on infected laundry when the test substances are applied in the wash bath. There are three aspects to this test:
1. the Germ Count of the wash bath is determined,
2. the textile samples are tested for the presence of any remaining bacteria by the Bacterial Growth Test, and
3. after being dried, the textile samples are tested for any residual sanitizing effect by the Inhibition Test.

This latter sanitizing effect is for example of special importance for hospital laundry, which is readily reinfected by germs in the air or from personnel handling the material before it is used again by the patient. These tests were carried out on the gram negative bacterium E.coli and on the gram postive bacterium Staph..aureus.

1. Wash

Raw, unfinished cotton fabric, which had not been treated with optical brightening agents was inoculated with 24 hour-old strains of the test bacteria, which had been prepared on agar slants. 2 g of this inoculated cotton fabric were added to each of the test wash baths containing 50 p.p.m. and 100 p.p.m. active ingredient respectively (calculated on the wash bath) and washed for 20 minutes at 40°C (liquor ratio 1:20).

Biological Tests a. Germ Count of the Wash Bath

A series of test agar plates were prepared to test for the presence of *Escherichia coli* bacteria by adding 20 ml of nutrient agar according to McConkey, and to test for the presence of *Staph.aureus* by adding 20 ml of nutrient agar containing 0,5 % by weight of potassium tellurite to 1 ml of the test wash baths and pouring the mixture into Petri dishes. After incubation for 24 hours at 37°C the colonies of germs were counted on the agar plates. The results are given in the table below:

| Compound | Disinfection Effect in the Wash Bath germs / milliliter | | | |
|---|---|---|---|---|
| | *E. coli* | | *Staph.aureus* | |
| | 50 ppm | 100 ppm | 50 ppm | 100 ppm |
| A | 0 | 0 | 0 | 0 |
| B | 0 | 0 | 0 | 0 |
| C | 0 | 0 | 0 | 0 |
| D | 0 | 0 | 0 | 0 |
| Control | >$10^5$ | >$10^5$ | >$10^5$ | >$10^5$ | b. Disinfection of the Textile Material

After removal of 1 ml sample of the wash bath for the germ count test, the cotton samples (2,5 cm in diameter) were each rinsed twice with permutite water and placed on the agar plate prepared according to McConkey, supra, and nutrient agar containing 0,5% by weight of potassium tellurite for tests with *E.coli* and *Staph.aureus* respectively. The agar plates in Petri dishes were incubated for 24 hours at 37°C and the bacterial growth on the textile samples and on the agar plates was evaluated visually. The results are given in the table below wherein + represents growth under or/and on the textile sample − no growth on and under the textile sample.

| Compound | Disinfection of Textile Material — Bacterial Growth Test | | | |
|---|---|---|---|---|
| | *E.coli* | | *Staph.aureus* | |
| | 50 ppm | 100 ppm | 50 ppm | 100 ppm |
| A | − | − | − | − |
| B | − | − | − | − |
| C | − | − | − | − |
| D | − | − | − | − |
| Control | + | + | + | + | c. Inhibition Test (Residual sanitizing effect on the textile material).

Finally the remaining cotton samples were air-dried and tested for their residual disinfectant activity in the inhibition test.

10 ml each of Bacto-Agar (Difco) were poured into Petri dishes. 10 ml of molten nutrient agar prepared as stated under a), and inoculated with *E.coli* and *Staph.aureus* respectively were overlaid on each of the prepared Petri dishes containing the Bacto-Agar. The dried cotton samples were laid on the plates which then were incubated for 24 hours at 37°C. Thereafter the zones of growth inhibition were determined in millimeters. The results are compiled in the table below:

| Compound | Residual Sanitizing Effect on the Textile Material (zones of inhibition in mm) | | | |
|---|---|---|---|---|
| | *E.coli* | | *Staph.aureus* | |
| | 50 ppm | 100 ppm | 50 ppm | 100 ppm |
| A | 4 − | 4 − | 10 − | 9 − |
| B | 2 − | 4 − | 7 − | 9 − |
| C | 3 − | 4 − | 9 − | 9 − |
| D | 3 − | 4 − | 8 − | 9 − |
| Control | 0 + | 0 + | 0 + | 0 + |

− = no growth
+ = growth

EXAMPLE 8

Laundry Test - Rinse Bath Disinfection

This test is similar to the wash bath disinfection test except that sterile textile material is used and the test bacteria as well as the test substances were both added to the third rinse bath and the following experiments performed:

1. Germ Count Test of the rinse bath,
2. Bacterial Growth Test - Disinfection of the textile material,
3. Residual Sanitizing Effect on the textile material in inhibition test.

1. Rinse

The cotton samples were rinsed twice for three minutes each at 20°C with sterile permutite water (liquor ratio 1:20 ).

To the third rinse bath the active ingredient to be tested was added to prepare the concentrations of 25 ppm, 50 ppm and 100 ppm a.i. calculated on the total rinse bath. Then the bath was inoculated with *E.coli* and *Staph.aureus* and the cotton samples then rinsed a third time for three minutes at 20°C.

2. Biological Tests a. Germ Count in the Rinse Bath 1 ml of the third rinse bath was added to 20 ml of nutrient agar prepared according to McConkey, to test *E.coli* and to 20 ml of nutrient agar containing 0,5 % by weight of potassium tellurite to test *Staph.aureus*. The resulting mixtures were poured into Petri dishes and incubated for 24 hours at 37°C. The viabel germ count per milliliter of rinse bath was determined by counting the number of colonies formed on the agar plates. The results are compiled in the following table:

| Compound | Disinfection Effect in the Rinse Bath germs / milliliter | | | |
|---|---|---|---|---|
| | *E.coli* | | *Staph.aureus* | |
| | 50 ppm | 100 ppm | 50 ppm | 100 ppm |
| A | 0 | 0 | 0 | 0 |
| B | 0 | 0 | 0 | 0 |
| C | 0 | 0 | 0 | 0 |
| D | 0 | 0 | 0 | 0 |
| Control | $10^5$ | $10^5$ | $10^5$ | $10^5$ | b. Disinfection of the Textile Material

After removal of 1 ml sample of the rinse bath for the germ count test, the cotton samples (2,5 cm in diameter) were each placed on one agar plate prepared according to McConkey, supra, thereby using nutrient agar and nutrient agar containing 0,5 % by weight of potassium tellurite for the tests with *E.coli* and *Staph*-

*aureus*, respectively. The agar plates were incubated for 24 hours at 37°C and then evaluated visually. The results are given in the table below, wherein + represents growth under or/and on the textile sample
− no growth on and under the textile sample.

Disinfection Test of Textile Material — Bacterial Growth Test

| Com- pound | E.coli | | Staph.aureus | |
|---|---|---|---|---|
| | 50 ppm | 100 ppm | 50 ppm | 100 ppm |
| A | − | − | − | − |
| B | − | − | − | − |
| C | − | − | − | − |
| D | − | − | − | − |
| Control | + | + | + | + | c. Inhibition Test (Residual sanitizing effect on the textile material).

Finally after the third rinse the remaining cotton samples were air-dried and tested for their residual disinfectant activity in the inhibition test. 10 ml each of Bacto Agar (Difco) were poured into Petri dishes. 10 ml of molten nutrient agar prepared as stated under a) and inoculated with *E.coli* and *Staph.aureus* respectively were overlaid on each of the prepared agar plates. The dried cotton samples were put on the agar, which then were incubated for 24 hours at 37°C. Thereafter the zones of growth inhibition were determined in millimeters. The results are given in the following table:

Residual Sanitizing Effect on the Cotton Samples (Zones of inhibition in mm)

| Com- pound | E.coli | | Staph.aureus | |
|---|---|---|---|---|
| | 25 ppm | 100 ppm | 25 ppm | 100 ppm |
| A | 2 − | 3 − | 6 − | 8 − |
| B | 2 − | 3 − | 3 − | 8 − |
| C | 2 − | 3 − | 5 − | 8 − |
| D | 1 − | 3 − | 5 − | 8 − |
| Control | 0 + | 0 + | 0 + | 0 + |

− = no growth
+ = growth

What we claim is:

1. A compound selected from the group consisting of 2',4,4',5-tetrachloro-2-hydroxy-diphenylether, 4,4',5-trichloro-2-hydroxy-diphenylether, 2',4,4'-trichloro-5-bromo-2-hydroxy-diphenylether, 4,4'-dichloro-5-bromo-2-hydroxy-diphenylether, 4,4',5-trichloro-3'-trifluoromethyl-2-hydroxy-diphenylether, 4',5-dichloro-2-hydroxy-diphenylether.

2. The compound according to claim 1 which is 2',4,4',5-tetrachloro-2-hydroxy-diphenylether.

3. The compound according to claim 1 which is 4,4',5-trichloro-2-yhdroxy-diphenylether.

4. The compound according to claim 1 which is 2',4,4'-trichloro-5-bromo-2-yhdroxy-diphenylether.

5. The compound according to claim 1 which is 4,4'-dichloro-5-bromo-2-hydroxy-diphenylether.

6. The compound to claim 1 which is 4,4',5-trichloro-3'-trifluoromethyl-2-hydroxy-diphenylether.

7. The compound according to claim 1 which is 4',5-dichloro-2-hydroxydiphenyl ethers.

* * * * *